July 28, 1970  E. W. GRONEMEYER  3,521,859
VALVE
Filed May 31, 1968   5 Sheets-Sheet 1
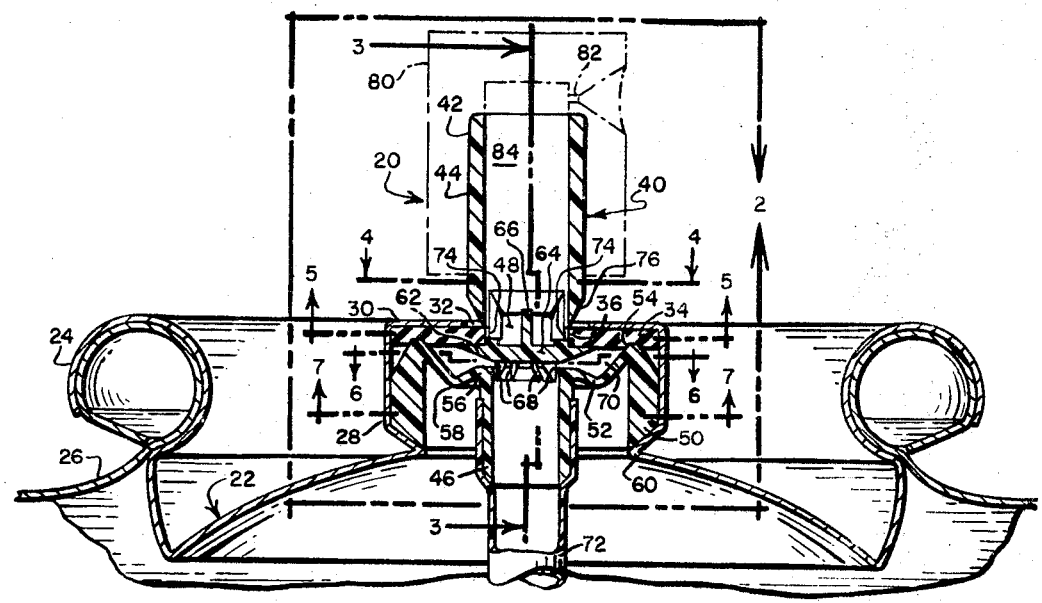
Fig. 1
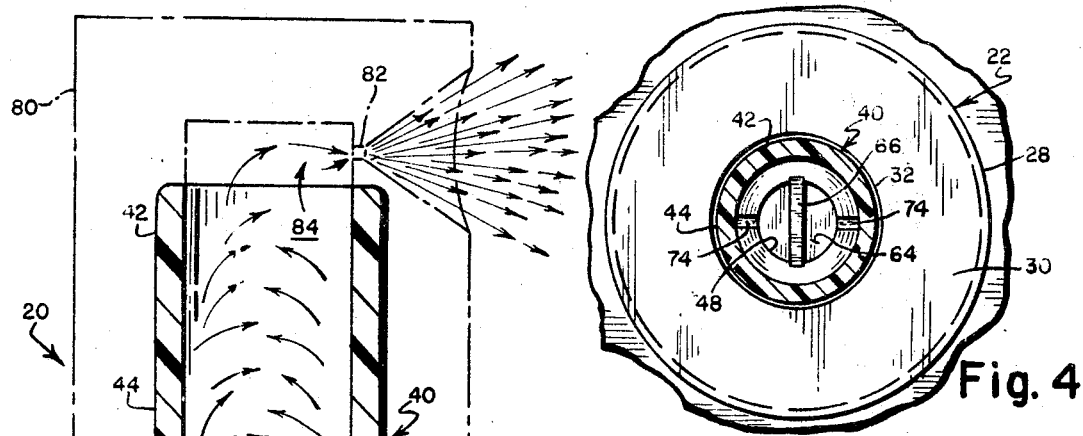
Fig. 2
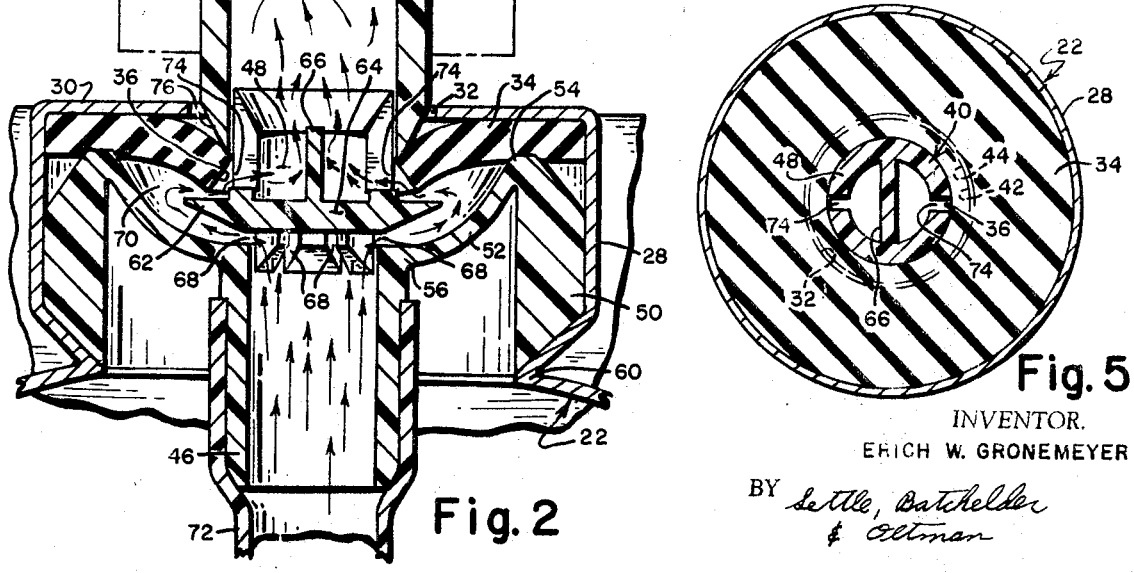
Fig. 4
Fig. 5
INVENTOR.
ERICH W. GRONEMEYER
BY Settle, Batchelder
& Oltman
ATTORNEYS

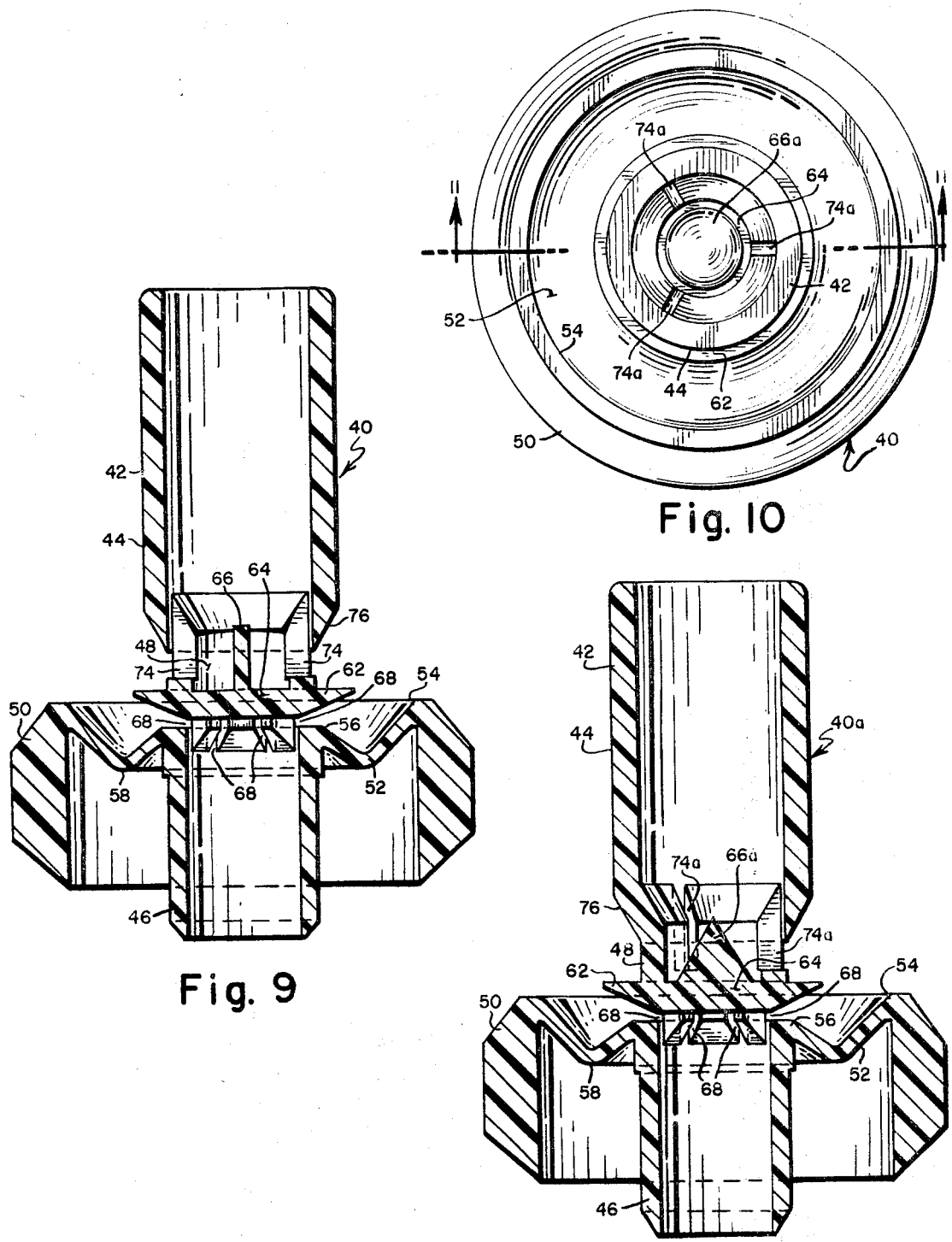

July 28, 1970  E. W. GRONEMEYER  3,521,859

VALVE

Filed May 31, 1968  5 Sheets-Sheet 4

INVENTOR.
ERICH W. GRONEMEYER
BY Settle, Batchelder
& Oltman
ATTORNEYS understand# United States Patent Office 3,521,859
Patented July 28, 1970

3,521,859
VALVE
Erich W. Gronemeyer, 3430 Galt Ocean Drive,
Fort Lauderdale, Fla. 33308
Filed May 31, 1968, Ser. No. 733,701
Int. Cl. F16k *31/58*
U.S. Cl. 251—353                                 12 Claims

ABSTRACT OF THE DISCLOSURE

A valve for discharging the pressurized contents of a container including a valve part comprised of a tubular stem, a ring encircling the stem and a membrane interconnecting the stem and the ring. This valve part is preferably molded integrally from plastic material, but the ring may be a separate piece. The stem has a portion blocking the interior thereof and at least one opening on each side of the blocking portion. A sealing washer closes the opening or openings on one side of the blocking portion, and the other opening or openings communicate with a compartment formed between the sealing washer and the membrane. A cap with an exit aperture therein may be applied to the top of the valve stem, thus forming another compartment. The ring is affixed to an annular part of the container and sealingly contacts the washer. When the valve stem is depressed or tilted, the sealing washer bends to clear at least one of the associated openings, and this opens the valve to discharge some of the contents of the container. The contents may be discharged as an aerosol, foam or liquid stream depending on the application.

BACKGROUND OF THE INVENTION

Although many types of aerosol valves are known, and much work has been done to improve them from time to time, there are still some drawbacks. Known aerosol valves usually consist of several parts, and the more parts there are, the higher the manufacturing costs and the cost of assembling the parts into a complete valve. It would be clearly desirable to reduce the number of parts in such valves. Also, the aerosolizing action of known valves has not been completely satisfactory. It would be desirable to provide a valve with improved aerosolizing action, and one which can also be used in other applications, for example, to dispense foam or a liquid stream.

SUMMARY OF THE INVENTION

The present invention provides a dispensing valve comprised of substantially fewer parts than known valves. In a preferred embodiment, one unitary part of the valve is comprised of a tubular valve stem, a ring encircling the valve stem, and a flexible, spring-like membrane the largest diameter of which is molded integrally to the ring, and the smallest diameter of which is molded integrally to the valve stem. The ring may be a separate piece if desired. The interior of the valve stem is closed at a point between the ends thereof by a blocking portion, and at least one first opening is formed in the valve stem on one side of the blocking portion and at least one second opening is formed in the valve stem on the opposite side of the blocking portion. The second opening or set of openings is closed by a sealing washer, and the first opening or set of openings communicates with the interior of the container and also with a small compartment formed between the sealing washer and the membrane. The valve part and sealing washer are assembled into an annular metal stamping with the ring of the valve part preferably being fastened to the annular stamping by crimping such that the ring seals against the sealing washer. A cap with an exit aperture is placed on top of the valve stem and thus forming a second compartment in the valve stem. A dip tube extends from the lower end of the valve stem into the contents of the container. When the valve stem is depressed, the sealing washer bends to uncover the second openings previously blocked thereby, and this opens the valve. When the valve is used to dispense an aerosol, aerosolizing action takes place in three stages:

(1) As the product passes through the first openings into the compartment, the first stage of aerosolizing takes place, and the product mixes in the first compartment, (2) As the product passes from the first compartment through the second openings into the second compartment, a second stage of aerosolizing takes place and further mixing occurs in the second compartment, (3) As the product leaves the second compartment and passes through the exit aperture, a third stage of aerosolizing takes place.

A baffle may be provided in the valve stem opposite the second opening to further assist in the breaking up of the particles of the product. There are preferably more first openings than second openings to ensure good mixing in the first compartment. The first openings are preferably smaller than any of the other openings and therefore act as a filtering screen.

If the valve stem is tilted rather than pushed straight down, and if there are a plurality of second openings, not all of these openings will be cleared, so a reduced flow results. Therefore it is possible to select between full flow and reduced flow.

Accordingly, it is an object of the present invention to simplify the construction of dispensing valves.

Another object of the invention is to provide a one piece plastic valve part which performs multiple functions in a dispensing valve.

A further object of the invention is to provide an aerosol valve with improved aerosolizing action.

Another object of the invention is to provide an aerosol valve whereby aerosolizing action takes place in several stages as the contents of a container pass through the valve.

Among the other objects of the invention are to provide an aerosol valve with parts which can be readily molded from plastic material, which can be easily and economically assembled, and which are reliable in operation.

Other objects of this invention will appear in the following description and appended claims, reference being had to the accompanying drawings forming a part of this specification wherein like reference characters designate corresponding parts in the several views.

On the drawings:

FIG. 1 is an enlarged vertical sectional view of a plastic valve in accordance with one embodiment of the invention applied to the top of a container and shown in a closed position;

FIG. 2 is a further enlarged vertical sectional view of the valve taken along line 2 of FIG. 1 showing the valve stem in an open position;

FIG. 4 is a plan sectional view taken along line 4—4 of FIG. 1;

FIG. 5 is a plan sectional view taken along line 5—5 of FIG. 1 looking upward in the direction of the arrows;

FIG. 9 is a vertical sectional view of just the valve part of FIG. 8;

FIG. 10 is a plan view of a valve part provided with a modified baffle and a modified arrangement of openings;

FIG. 11 is a vertical sectional view taken along line 11—11 of FIG. 10;

Figure 6:
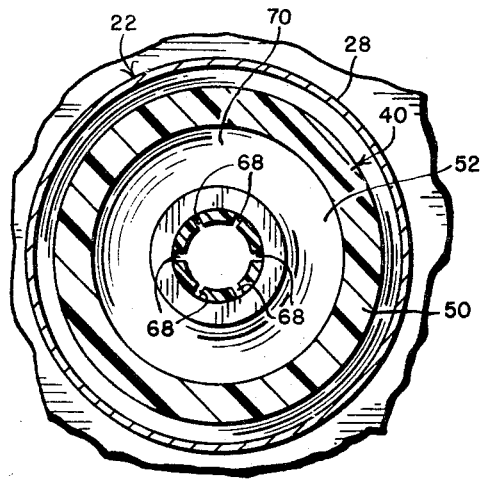
FIG. 6 is a plan sectional view taken along line 6—6 of FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

Referring to FIGS. 1–9, a valve 20 is applied to the top of a container which has a metal stamping 22 connected by a semicircular portion 24 to a rim 26 of the container. Stamping 22 includes an annular part 28 with a horizontally directed flange 30 having a central opening 32 therein.

The valve 20 includes a yieldable sealing washer 34 which fits inside the annular portion 28 of stamping 22 and butts against flange 30. Washer 34 has a central opening at 36 in alignment with the opening 32 in flange 30. Washer 34 is made of a yieldable resilient material such as plastic or rubber, rubber being shown in the drawings.

Valve 20 also includes a one piece plastic valve part generally designated 40. This valve part includes a tubular valve stem 42 having an outer portion 44 outside the container, an inner portion 46 inside the container and an intermediate portion 48 extending through sealing washer 34 and flange 30. The intermediate portion 48 shows up most clearly in FIG. 3.

In addition to valve stem 42, valve part 40 includes a generally cylindrical ring 50 encircling valve stem 42, and a resiliently flexible spring-like membrane 52 extending transversely of valve stem 42 and interconnecting ring 50 and inner portion 46 of the valve stem. The outer diameter of membrane 52 at 54 is molded integrally with the top of ring 50, and the inner diameter of membrane 52 at 56 is molded integrally with inner portion 46 of valve stem 42. The membrane 52 has a bend at 58 which facilitates flexing of the membrane so that valve stem 42 can be depressed easily.

The ring 50 fits inside the annular portion 28 of stamping 22. Stamping 22 is crimped at 60 so as to urge ring 50 upwardly so that the top 54 of ring 50 sealingly contacts the washer 34. Since washer 34 is yieldable, top edge 54 of ring 50 pushes into washer 34 slightly and thus forms a good seal.

A stem seal 62 projects radially outwardly from valve stem 42, and when the valve is assembled with the container as in FIG. 1, stem seal 62 is urged by a spring action of membrane 58 and also by the pressure in the container against sealing washer 34 to form a seal. Stem seal projection 62 may be thin and flexible so as to conform to any irregularity in the sealing washer 34 and thus provide a tight seal.

The interior of valve stem 42 is blocked by a blocking portion 64 molded integrally with the side wall of the valve stem. Blocking portion 64 is preferably located in alignment with stem seal 62 just above the inner diameter 56 of membrane 52. A baffle 66 is molded integral with blocking portion 64 and projects upwardly from blocking portion 64. The baffle 66 extends transversely across the interior of the valve stem and is integral with the side wall of the valve stem as shown best in FIG. 5.

A first set of openings 68 are formed through the wall of the valve stem 42 between blocking portion 64 and membrane 52. There must be at least one such opening 68, and in the illustrated embodiment there are six openings 68. These openings lead from the interior of inner valve stem portion 46 to a compartment 70 formed between membrane 52 and sealing washer 34. Openings 68 communicate with the interior of the container through a dip tube 72 which is attached to the inner stem portion 46.

A second set of openings 74 are formed through the wall of valve stem 42 at the intermediate portion 48 thereof. The second openings 74 are most clearly visible in FIGS. 4 and 5. The second openings 74 are normally blocked by the inner edge of the sealing washer 34. The opening 36 through sealing washer 34 is smaller than the outside diameter of intermediate portion 48 of valve stem 42, so the sealing washer 34 tightly grips intermediate portion 48 and blocks openings 74. As shown most clearly in FIG. 3, the outside diameter of intermediate valve stem portion 48 is smaller than the diameter of portion 44, and there is a tapering surface 76 which prevents upward displacement of sealing washer 34, downward displacement of the washer, relative to intermediate portion 48 being prevented by stem seal 62.

Figure 8:
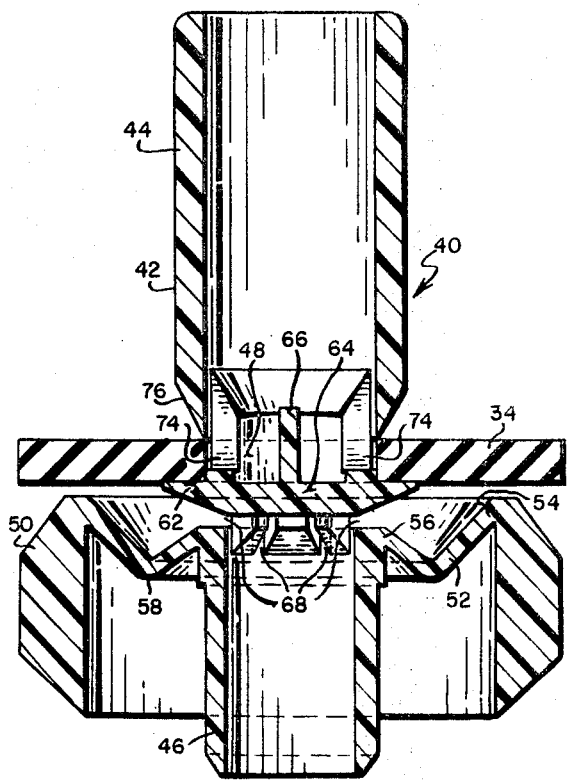
FIG. 8 is a vertical sectional view of a valve part assembled with a sealing washer, these parts being included in the embodiment shown in FIG. 1.
Figure 3:
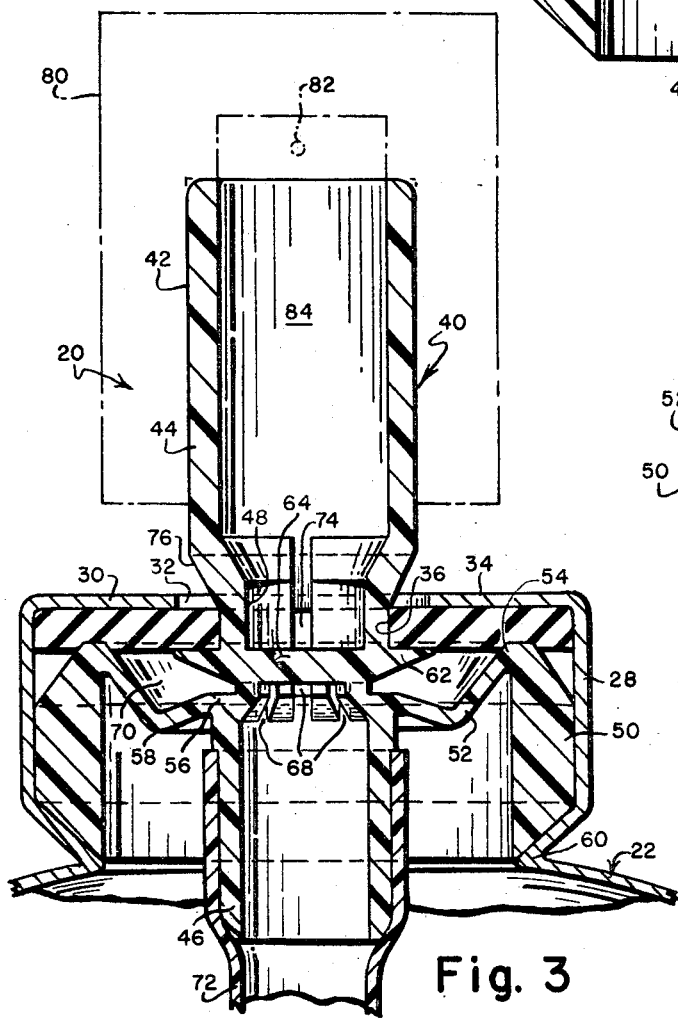
FIG. 3 is a vertical sectional view taken on line 3—3 of FIG. 1.
Figure 7:
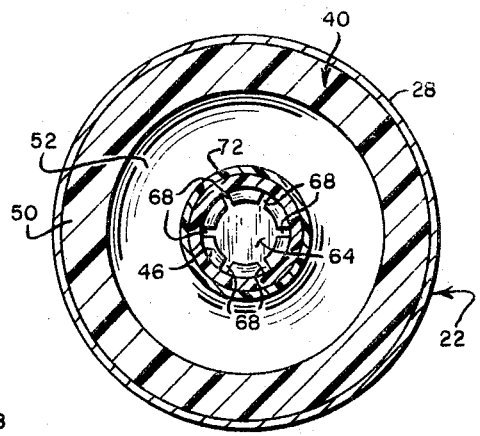
FIG. 7 is a plan sectional view taken along line 7—7 of FIG. 1 looking upward in the direction of the arrows.
Figure 13:
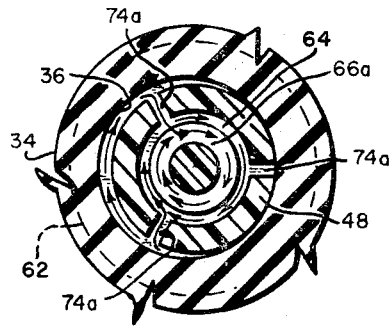
FIG. 13 is a partial cross sectional view taken along line 13—13 of FIG. 12.
Figure 15:
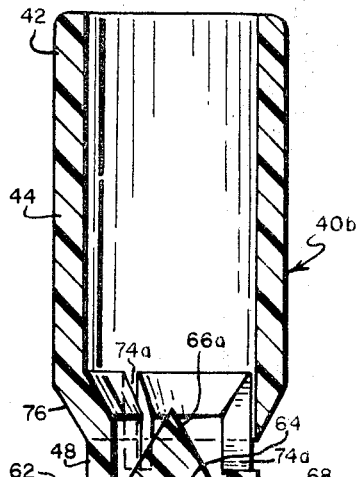
FIG. 15 is a vertical sectional view of a valve part having a highly elastic membrane.
Figure 12:
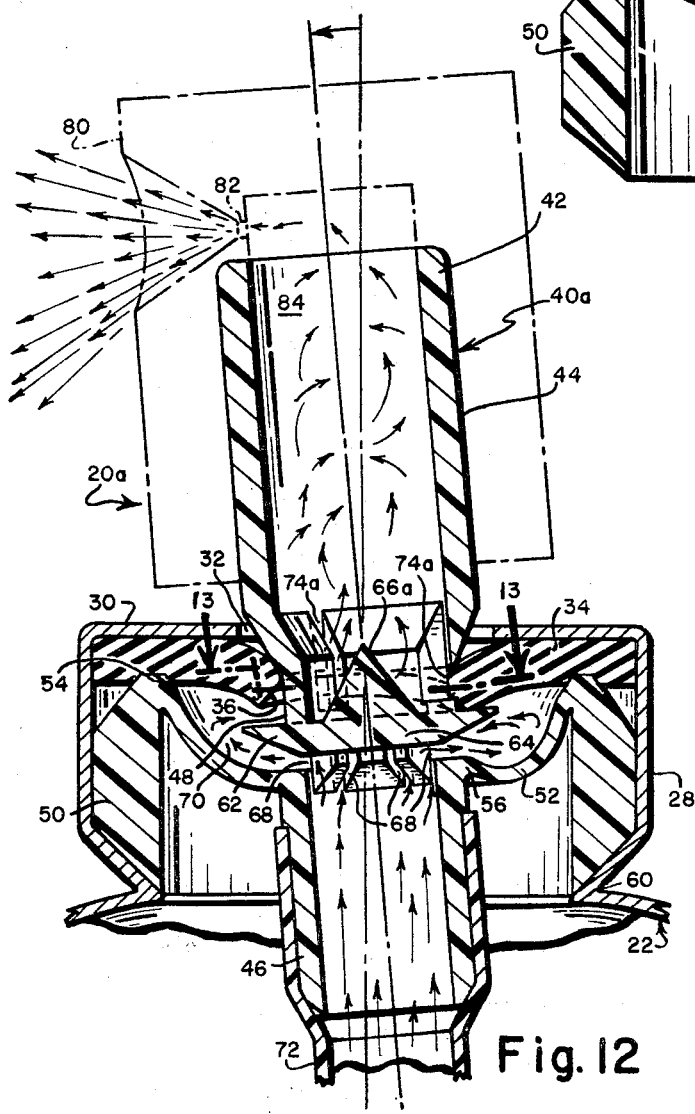
FIG. 12 is a vertical sectional view of the valve part of FIG. 11 in a complete valve and operated by tilting it to the side.
Figure 14:
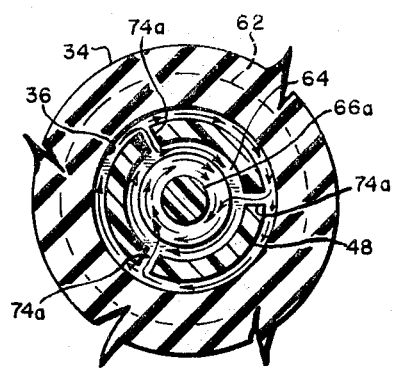
FIG. 14 is a partial cross sectional view similar to FIG. 13, but showing the condition of the valve when it is pushed straight down.
Figure 16:
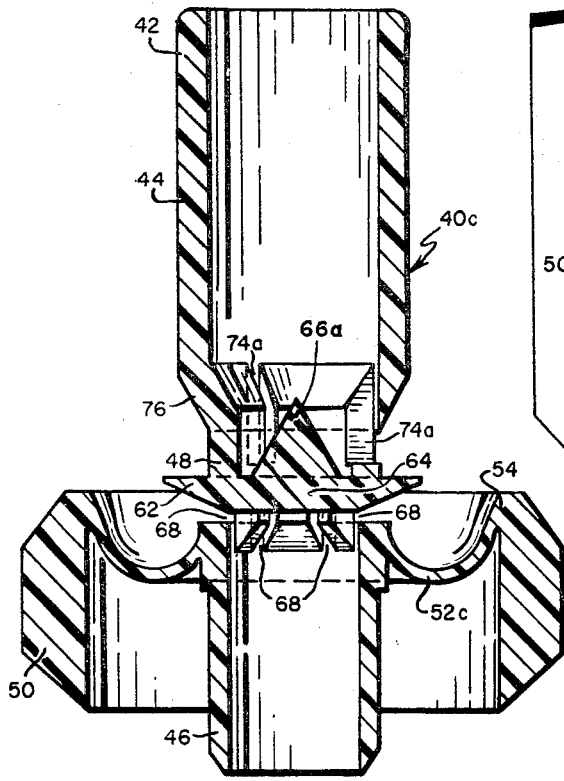
FIG. 16 is a vertical sectional view of a valve part having a curved membrane.
Figure 18:
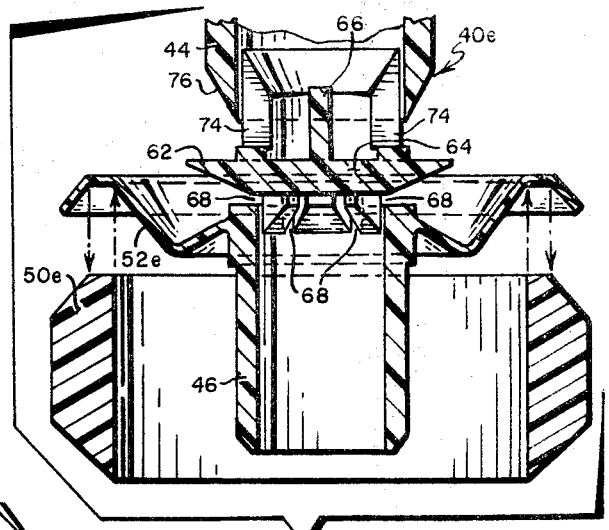
FIG. 18 is a vertical sectional view of a valve assembly in which the sealing ring is a separate piece, the ring being shown spaced below the membrane.
Figure 17:
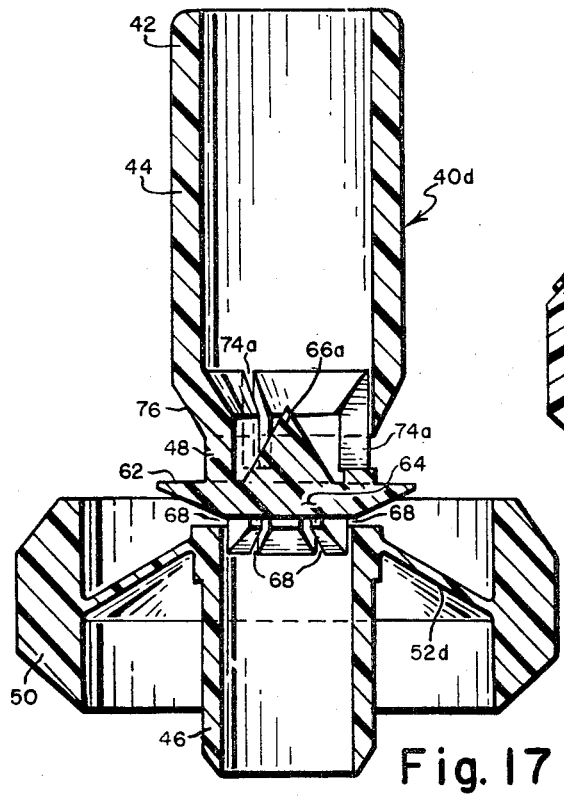
FIG. 17 is a vertical sectional view of a valve part having a membrane connected to the center of a sealing ring.
Figure 19:
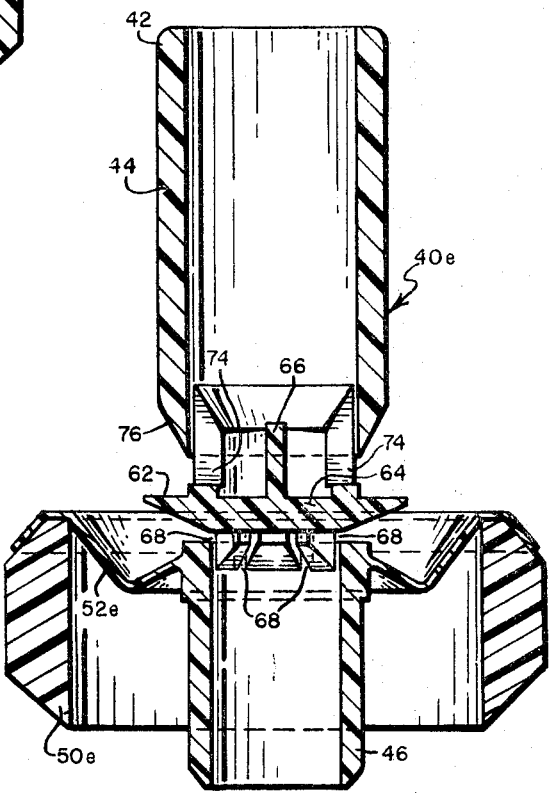
FIG. 19 is a vertical sectional view of the valve assembly of FIG. 18 in an assembled condition.

FIG. 8 shows the valve part 40 assembled with the sealing washer 34 before this assembly is placed in the metal stamping 22. This shows that before ring 50 is crimped into annular part 28, the top of ring 50 at 54 is spaced below sealing washer 34. Then when ring 50 is crimped into annular part 28 of metal stamping 22, ring 50 forms the seal referred to previously, and membrane 58 is flexed so that it urges the valve stem 42 and also sealing washer 34 upwardly.

A cap 80 having a very small discharge aperture 82 extending through it is placed on the top of valve stem 42 to form a second compartment 84 within the valve stem. Of course, aperture 82 could be in valve stem 42 rather than in the cap, but this is not preferred.

In order to discharge the contents of the container, cap 80 and valve stem 42 are depressed in the manner shown in FIG. 2. The membrane 52 flexes downwardly to allow depression of the valve stem. The valve stem bends sealing washer 34 downwardly as shown in FIG. 2, and it may be seen that the inner edge of the sealing washer at 36 pulls away from the openings 74 and also the stem seal 62 to uncover the openings 74. This opens the valve so that the discharging can take place through the valve. The aerosolizing of the contents of the container occurs in three stages. First, as the contents pass through openings 68 they are partially broken up. The contents then pass through compartment 70, and mixing takes place in this compartment. This mixing is encouraged by providing more of the first openings 68 than the second openings 74, and as a consequence the streams passing through openings 68 have to partially join in order to pass through openings 74 with mixing clearly taking place as a result. The second stage of aerosolizing occurs when the contents pass through openings 74 into the second compartment 84. As the contents emerge from openings 74, they are directed against baffle 66 which deflect the particles and thus encourages further mixing in compartment 84 as indicated by the irregular paths shown by the arrows therein in FIG. 2. The third and final stage of aerosolizing occurs when the contents pass through the small exit aperture 82 in cap 80.

The first openings 68 are preferably smaller than openings 74 and opening 80. Thus, openings 68 act as a filtering screen to take out any particles which might clog openings 74 or 80. The fact that there are several openings 68 is helpful because if one such opening should become clogged the others are still effective.

It is possible to provide a very small opening in membrane 52 which will further assist mixing action in compartment 70. Such opening should be made even smaller than filtering openings 68. When the valve stem 42 is depressed, the contents of the can will pass through openings 68 and 74 as previously described. A small amount of gas will pass through the small opening in membrane 52 and encourage mixing in compartment 70.

A slight modification of the valve part 40 is shown in FIGS. 10 and 11. Since the embodiment of FIGS. 10 and 11 is very similar to that of FIGS. 1–9, the same reference numerals are used for like parts. In FIGS. 10 and 11, three apertures *74a* are formed through intermediate portion 48 of the valve stem 42. In this case, a conical baffle *66a* projects upwardly from blocking portion 64 and is located directly opposite openings *74a*. baffle *66a* serves to deflect and mix the streams emerging from openings *74a* in the operation of the device. A conical baffle *66a* could be used no matter how many of the apertures *74a* are provided.

FIGS. 12 and 13 show the valve part *40a* of FIG. 11 assembled with a sealing washer 34 in a complete valve *20a*, and also show how the valve part *40a* can be operated by tilting it rather than by pushing it straight down. Parts which are the same as in the embodiment of FIGS. 1–9 have the same reference numerals. When valve part *40a* is tilted to the left shown in FIG. 12, the left side of the sealing washer 34 bends down and its inner edge 36 pulls away from two of the openings *74a* (see FIG. 13), thus partially opening the valve to discharge some of the contents of the container. The third opening *74a* on the right side of the valve stem as viewed in FIGS. 12 and 13 remains closed. The valve stem has been depressed slightly as well as being tilted, so the right side of washer 34 is shown in a somewhat depressed condition, but the washer has not been bent down far enough at its right side to clear the right-hand opening *74a*. FIG. 14 is a view very similar to FIG. 13 but showing how all three openings *74a* are cleared when the valve stem is depressed straight down.

Thus, the valve can be partially opened by pushing the valve stem transversely of the container, or fully opened by depressing the valve stem. It is therefore possible to select between different discharge rates, i.e. a low rate or a high rate.

FIG. 15 shows a valve part *40b* which is identical to valve part *40a* (FIG. 11) except that a membrane *52b* is provided which has no bend in it. The membrane *62b* should be made sufficiently elastic that it will stretch easily when the valve stem 42 is depressed or tilted. This can be done by appropriate selection of plastic material for the valve part.

In FIG. 16, the valve part *40c* is the same as valve part *40a* except that the membrane *52c* is curved rather than having a sharper bend at 58 as in FIG. 11.

FIG. 17 shows still another modification wherein the valve part *40d* has a membrane *52d* which connects to the middle of ring 50 rather than to its top edge.

FIGS. 18 and 19 show a valve assembly *40e* which is identical to the valve part 40 of FIGS. 1–9 except that the ring *50e* is a separate piece in FIGS. 18 and 19, whereas it is integral with membrane 52 in FIGS. 1–9. Membrane *52e* overlaps the top of ring *50e* when the parts are assembled as in FIG. 19.

It is apparent from the foregoing description that the invention provides a valve for dispensing pressurized products which consists of very few parts, and this keeps the cost of fabrication and assembly down. The valve is particularly suited for aerosolizing applications, but may also be used for foaming or dispensing liquid as a stream of liquid. When used as an aerosol valve, the aerosolizing action is unusually good, due at least partly to the multiple stage aerosolizing which takes place in the valve and the effectiveness of the baffle in encouraging mixing action.

Having thus described my invention, I claim:

1. A valve for discharging pressurized liquid contents of a container or an aerosol, the container having a rigid annular part with an opening therein at the top of the container, said valve including in combination, a yieldable sealing member having an opening therein for fitting inside said annular part of said container with said openings in registry, and a one piece plastic valve part comprising a ring to be affixed to the inside of said annular part in sealing contact with said sealing member, a hollow valve stem centrally of said ring, and a resiliently flexible transversely extending membrane interconnecting said valve stem and said ring, said valve stem having a radially projecting stem seal for sealingly contacting said sealing member on the same side thereof as said ring so that said sealing member, said membrane and said stem seal form a first compartment when assembled, a blocking portion blocking the interior of said valve stem, at least one first opening on one side of said blocking portion leading from the interior of said valve stem to a space between said stem seal and said membrane, the outside diameter of said valve stem at said first opening being substantially the same as the inside diameter of said valve stem below said first opening, and at least one second opening on the other side of said blocking portion leading from said space to the interior of said valve stem, the outside diameter of said valve stem at said second opening being substantially the same as the inside diameter of said valve stem above said second opening, the second opening normally being blocked by said sealing member and said valve part being movable to bend the inner portion of said sealing member away from said second opening to provide a through passage from the interior of said valve stem on said one side of said blocking portion through said first and second openings to the interior of said valve stem on said other side of said blocking portion, the latter portion of the valve stem being adapted to be closed to form a second compartment with an aperture through which aerosol can escape.

2. In a valve for discharging pressurized liquid contents of a container or an aerosol, the container having a rigid annular part with an opening therein at the top of the container, said valve including a yieldable annular sealing washer fitting inside said annular part of said container, said washer having an opening registering with said container opening, a hollow valve having an integral resilient membrane interconnecting said valve and an outer integral ring entrapped by said annular part, the improvement of a radially projecting sealing flange on said valve for sealingly contacting said sealing washer immediately adjacent said washer opening, a radial wall projecting across the interior of said valve, at least one first opening on one side of said blocking portion leading from the interior of said valve to a space between said stem and said membrane, the outside diameter of said valve at said first opening being substantially the same as the inside diameter of said valve below said first opening, and at least one second opening on the other side of said radial wall leading from said space to the interior of said valve stem, the outside diameter of said valve stem at said second opening being substantially the same as the inside diameter of said valve stem above said second opening, the second opening normally being blocked by said sealing washer and said valve part being movable to bend the inner portion of said sealing washer away from said second opening to provide a through passage from the interior of said valve stem on said one side of said radial wall through said first and second openings to the interior of said valve stem on said other side of said wall, the latter portion of the valve stem being adapted to be closed to form a second compartment with an aperture through which aerosol can escape.

3. In a valve for a pressurized container having a unitary tubular valve stem surmounted by a cap having a discharge aperture, said valve stem including open-ended inlet and outlet passages separated by a medial radial wall, and an integral biasing diaphragm encircling the valve stem, said diaphragm being anchored at its outer periphery to the container to bias the valve stem in a direction toward its outlet passage, a resiliently distortable annular washer having its outer periphery fixed to the container and its inner periphery sealingly engaging said valve stem, a plurality of radial ports through said valve stem normally covered by the inner periphery of said washer and opening onto said outlet passage, a plurality of radial slots in said valve stem adjacent said radial wall and communicating with said inlet opening, said slots each having a width less than the diameter of said discharge aperture and the total area of said slots being substantially greater than the area of said discharge aperture, a peripheral sealing flange on said valve stem interposed between said slots and said ports, said flange having an extended surface urged into sealing engagement with said washer by the bias of said diaphragm, and baffle means integral with said radial wall and projecting into said outlet passage so that material flowing through said radial ports impinges thereon.

4. In a dispensing valve for a pressurized container, a unitary tubular valve stem projecting through a resiliently distortable washer, the valve stem having an encircling diaphragm cooperating with the washer to define a chamber therebetween, the washer and the diaphragm being entrapped in a housing, the diaphragm urging the valve stem in one direction and the stem being displaceable against the bias of the diaphragm to distort the washer into said chamber, the valve stem having inlet and outlet openings separated by a radial wall, a spray discharge orifice communicating with said outlet opening, a plurality of strainer slots, each narrower than said orifice, interconnecting said inlet opening and said chamber, a plurality of outlet parts normally blocked by said washer and interconnecting said chamber and said stem outlet opening when said stem is moved against the bias of the diaphragm to distort said washer, and thin outwardly reduced seal flange urged against said washer by the bias of said diaphragm.

5 In a valve for a pressurised container, the combination of an axially elongated tubular valve stem and an annular sealing washer surrounding the valve stem medially thereof, said stem having an integral peripheral diaphragm cooperating with one surface of the washer to define a compartment therebetween, said washer and said diaphragm being sealingly fixed at their outer peripheries by a container part, said valve stem having (1) a reduced diameter medial portion surrounded by the inner edge of said annular washer, (2) a radial interior wall at said medial portion blocking any flow through said stem, (3) a peripherally enlarged flange urged against the compartment-defining surface of the washer by said diaphragm, (4) a series of radial openings at said medial portion beneath said interior wall establishing flow paths from the interior of said stem into said compartment, (5) a conical exterior surface insertable into the opening of said washer to deflect the washer downwardly into said compartment and (6) a plurality of radial openings at said medial portion above said interior wall normally closed by said washer and uncovered when the washer is deflected to accommodate flow from the compartment, around the valve stem flange and through the washer opening.

6. In a mechanism for dispensing gases and liquids from a container under pressure and wherein it is necessary to dispense material by a valve mechanism fitted into minimal space, the combination of a one-piece tubular valve having a reduced medial neck traversed by an internal wall defining upper and lower passages with an annular resiliently distortable washer encircling said neck, said valve having a peripheral flange abutting the undersurface of said washer and a conical upwardly enlarged surface overlying said washer, said valve having a radially projecting diaphragm joining the valve in spaced relation to said flange, said diaphragm being sealed to the undersurface of said washer radially outwardly of said valve, first flow openings through the wall of the lower valve passage and located at the end of said passage immediately adjacent said wall and opening onto the space between said flange and said diaphragm, second flow openings through the wall of the upper valve passage normally closed by the inner periphery of said washer and exposed when the valve body is depressed to distort said washer, so that the valve passages communicate through said first and second flow openings interconnected by the distorted washer and the flange spaced from the undersurface of said washer.

7. A valve for discharging pressurized material from a container, the container having a rigid annular part with an opening therein at the top of the container, said valve including in combination, a yieldable sealing member having an opening therein, said sealing member being adapted to be assembled into said annular part of said container with said openings in alignment, a tubular valve stem having an outer portion, an inner portion and an intermediate portion, a ring for encircling said valve stem, and a resiliently flexible membrane extending transversely of said valve stem for interconnecting said valve stem and said ring, said valve stem having a portion spaced inwardly from both ends thereof blocking the interior of said valve stem, a stem seal portion projecting outward from said blocking portion, at least one first opening through said inner portion of said valve stem between said blocking portion and said membrane, the outside diameter of said inner stem portion at said first opening being substantially the same as the inside diameter of said inner stem portion below said opening, and at least one second opening through said intermediate portion of said valve stem on the side of said blocking portion opposite from said first opening, the outside diameter of said intermediate stem portion at said second opening being substantially the same as the inside diameter of said outer stem portion above said opening, said valve stem being adapted to be assembled with said sealing member so that said valve stem extends through said opening in said sealing member with said sealing member blocking said second opening, and said valve stem, ring, membrane and sealing member being adapted to be assembled into said annular part of said container with said annular part pressing said ring toward said sealing member and said membrane urging said stem seal portion into sealing contact with said sealing member to form a sealed first compartment with which said first opening communicates and said valve stem extending through said opening in said annular part, said valve stem being adapted to have a closure applied thereto for forming a second compartment having an exit aperture, and said valve stem being movable to flex said membrane and uncover said second opening so that the material can flow from said container through said first opening said first compartment, said second opening, said second compartment and out said exit aperture with mixing action taking place in said compartments.

8. The valve as claimed in claim 7 in which a plurality of said first openings are provided, there being more of said first openings than said second openings to obtain a mixing action in said first compartment.

9. The valve as claimed in claim 8 in which said first openings are sufficiently small to serve a filtering function.

10. In a container and valve assembly for discharging pressurized contents of the container, the container having a rigid annular part with an opening therein at the top of the container, the combination including a yieldable sealing washer in said annular part having an opening smaller than but registering with the opening in said annular part; a one piece plastic valve part comprising a tubular valve stem having an outer portion outside said container, an inner portion inside said container and an intermediate portion extending through and sealingly gripped by said sealing washer, a ring encircling said valve stem and retained by said annular part in sealing contact with said sealing washer, and a resiliently flexible membrane interconnecting said valve stem and said ring, said membrane and said sealing washer forming a first compartment, said valve stem including a blocking portion blocking the interior of said valve stem immediately adjacent said intermediate portion, at least one first opening through said inner portion of said valve stem leading from the interior thereof into said first compartment, the outside diameter of said inner stem portion at said first opening being substantially the same as the inside diameter of said inner stem portion below said first opening, and at least one second opening through said intermediate portion of said valve stem blocked by said sealing washer, the outside diameter of said intermediate stem portion at said second opening being substantially the same as the inside diameter of said outer stem portion above said second opening; and means for closing said outer portion of said valve stem to form a second compartment therein with a small aperture allowing escape of aerosol therefrom, said valve stem being movable to flex said membrane and bend said sealing washer toward said membrane to uncover said second opening and thereby provide a passageway for flow of the contents of said container from said inner portion of said valve stem through said first opening, said first compartment said second opening, said second compartment and out through said aperature.

11. The assembly as claimed in claim 10 in which said valve stem further includes a stem seal portion projecting radially outward and normally in sealed contact with said sealing washer on the same side thereof as said ring, said sealing washer clearing said stem seal portion due to the bending thereof when said valve stem is depressed, thereby uncovering said second opening.

12. The assembly as claimed in claim 11 in which said stem seal portion of said valve stem is thin and flexible to conform to any irregularities of said sealing washer.

References Cited
UNITED STATES PATENTS

| | | | |
|---|---|---|---|
| 2,883,090 | 4/1959 | Remane | 222—402.24 |
| 3,145,011 | 8/1964 | Kappel | 251—349 |
| 3,203,665 | 8/1965 | Grant et al. | 251—353 XR |
| 3,248,015 | 4/1966 | De Giorgi | 251—353 XR |
| 3,333,744 | 8/1967 | Nilsen et al. | 251—353 XR |
| 3,348,743 | 10/1967 | Green | 251—353 XR |
| 3,434,695 | 3/1969 | Green | 251—349 |

SAMUEL SCOTT, Primary Examiner

U.S. Cl. X.R.

222—402.24